(12) United States Patent
Kim et al.

(10) Patent No.: US 12,193,985 B2
(45) Date of Patent: Jan. 14, 2025

(54) STRENGTH ASSIST DEVICE

(71) Applicants: HYUNDAI MOTOR COMPANY, Seoul (KR); KIA CORPORATION, Seoul (KR); HYUNDAI ROTEM COMPANY, Changwon-si (KR)

(72) Inventors: Kyu Jung Kim, Seoul (KR); Hyun Seop Lim, Anyang-si (KR); Sang In Park, Suwon-si (KR); Ju Young Yoon, Suwon-si (KR); Dong Jin Hyun, Suwon-si (KR); Ki Hyeon Bae, Yongin-si (KR); Beom Su Kim, Yongin-si (KR); Dae Je Kim, Hanam-si (KR)

(73) Assignees: HYUNDAI MOTOR COMPANY, Seoul (KR); KIA CORPORATION, Seoul (KR); HYUNDAI ROTEM COMPANY, Changwon-si (KR)

( * ) Notice: Subject to any disclaimer, the term of this patent is extended or adjusted under 35 U.S.C. 154(b) by 851 days.

(21) Appl. No.: 17/354,374

(22) Filed: Jun. 22, 2021

(65) Prior Publication Data
US 2022/0160571 A1    May 26, 2022

(30) Foreign Application Priority Data
Nov. 20, 2020    (KR) .................. 10-2020-0156981

(51) Int. Cl.
*A61H 1/02*    (2006.01)
(52) U.S. Cl.
CPC .......... *A61H 1/0274* (2013.01); *A61H 1/0281* (2013.01); *A61H 2201/149* (2013.01); *A61H 2201/5071* (2013.01)

(58) Field of Classification Search
CPC ... A61H 1/0274; A61H 1/0277; A61H 1/0281
See application file for complete search history.

(56) References Cited

U.S. PATENT DOCUMENTS

| 3,449,769 A | * | 6/1969 | Mizen | ........................ | A61F 2/54 |
| | | | | | 623/66.1 |
| 5,282,460 A | * | 2/1994 | Boldt | ........................ | B25J 9/146 |
| | | | | | 403/119 |

(Continued)

FOREIGN PATENT DOCUMENTS

| DE | 10 2016 104 879 A1 | 9/2017 |
| EP | 2 665 449 B1 | 11/2017 |

(Continued)

OTHER PUBLICATIONS

Kim et al., Assessing the influence of a passive, upper extremity exoskeletal vest for tasks requiring arm elevation: Part I—"Expected" effects on discomfort, shoulder muscle activity, and work task performance, Applied Ergonomics 70 (2018), pp. 315-322.

(Continued)

*Primary Examiner* — Samchuan C Yao
*Assistant Examiner* — Nicholas B. Engel
(74) *Attorney, Agent, or Firm* — Lempia Summerfield Katz LLC

(57) ABSTRACT

A strength assist device includes: a multi-link part including one or more links; a profile controller that is connected to one end portion of the multi-link part, and rotates around a central rotational axis; and an elastic force providing part that is connected to the other end portion of the multi-link part, and provides an elastic force to the multi-link part. When the profile controller rotates and one end portion of the multi-link part revolves around the central rotational axis, the elastic force applied to the multi-link part varies.

14 Claims, 14 Drawing Sheets

(56) References Cited

U.S. PATENT DOCUMENTS

| | | | |
|---|---|---|---|
| 8,585,620 B2 * | 11/2013 | McBean | A61H 1/008 601/24 |
| 9,737,374 B2 | 8/2017 | Doyle | |
| 10,383,785 B2 | 8/2019 | Doyle | |
| 10,463,560 B2 * | 11/2019 | Deshpande | A61F 2/78 |
| 10,617,551 B2 | 4/2020 | Doyle et al. | |
| 10,639,785 B2 | 5/2020 | Van Engelhoven et al. | |
| 10,813,822 B1 | 10/2020 | Bae et al. | |
| 11,318,602 B1 * | 5/2022 | Chou | B25J 9/104 |
| 11,779,504 B2 * | 10/2023 | Kim | A61H 1/0281 601/5 |
| 2012/0184880 A1 * | 7/2012 | Doyle | B25J 9/0006 601/33 |
| 2012/0271207 A1 * | 10/2012 | Schoen | A61F 5/0102 601/34 |
| 2014/0158839 A1 * | 6/2014 | Doyle | A61F 5/013 248/118 |
| 2016/0206497 A1 * | 7/2016 | Deshpande | A61H 1/02 |
| 2016/0317375 A1 * | 11/2016 | Simon | A61F 2/605 |
| 2016/0339583 A1 * | 11/2016 | Van Engelhoven | B25J 9/0006 |
| 2017/0173783 A1 * | 6/2017 | Angold | B25J 9/0006 |
| 2020/0281796 A1 * | 9/2020 | Lakany | A61H 1/0277 |
| 2020/0315896 A1 | 10/2020 | Bae et al. | |
| 2020/0315898 A1 | 10/2020 | Bae et al. | |

FOREIGN PATENT DOCUMENTS

| | | |
|---|---|---|
| KR | 10-2142570 B1 | 8/2020 |
| KR | 10-2020-0118296 A | 10/2020 |

OTHER PUBLICATIONS

Kim et al., Assessing the influence of a passive, upper extremity exoskeletal vest fortasks requiring arm elevation: Part II—"Unexpected" effects on shoulder motion, balance, and spine loading, Applied Ergonomics 70 (2018), pp. 323-330.

* cited by examiner

STRENGTH ASSIST DEVICE

CROSS-REFERENCE TO RELATED APPLICATION

This application claims priority to and the benefit of Korean Patent Application No. 10-2020-0156981, filed on Nov. 20, 2020, the entire contents of which are incorporated herein in by reference.

FIELD

The present disclosure relates to a strength assist device, and more particularly, to a strength assist device capable of providing an assist force during a user's activities or tasks.

BACKGROUND

The statements in this section merely provide background information related to the present disclosure and may not constitute prior art.

One of devices designed to provide an assist force to support a user's activities or tasks may be, for example, an upper arm strength assist device that is mounted on the user's arm. Such an upper arm strength assist device may be provided with a mechanism of forming a torque for reducing a load caused by the weight of the user's arm and the weight of an object supported by the user's arm. For example, the upper arm strength assist device has different magnitudes of torque depending on rotation angles of the device, which means that there is a functional relationship in which the magnitude of the torque is determined by the rotation angle. This functional relationship is called a "torque profile".

Meanwhile, the magnitude of the torque required for the strength assist device varies according to the types of tasks that the user performs. For example, even if the rotation angle of the upper arm strength assist device is the same, a load applied to the user varies according to the types of tasks that the user performs. Thus, when the task type performed by the user is changed, the torque profile required for the upper arm strength assist device needs to be changed as well.

However, we have discovered that in order to change the torque profile, it is desired to replace components (e.g., springs) of the strength assist device or adjust the properties of the components (e.g., the tension of the spring). Thus, it may be cumbersome to change the torque profile of the strength assist device.

SUMMARY

An aspect of the present disclosure provides a strength assist device capable of easily changing a torque profile.

According to an aspect of the present disclosure, a strength assist device may include: a multi-link part including one or more links; a profile controller connected to one end portion of the multi-link part, and rotating around a central rotational axis; and an elastic force providing part connected to the other end portion of the multi-link part, and providing an elastic force to the multi-link part. When the profile controller rotates, one end portion of the multi-link part may revolve around the central rotational axis, and the profile controller may selectively allow or restrict the revolution of one end portion of the multi-link part.

The multi-link part may include a first link having one end connected to the profile controller, and when the profile controller rotates, one end of the first link may revolve around the central rotational axis, and the force which the elastic force providing part applies to the multi-link part may vary.

The multi-link part may further include a second link having one end connected to the elastic force providing part, and when the profile controller rotates, one end of the second link may move, and the force which the elastic force providing part applies to the multi-link part may vary.

The multi-link part may further include a third link having a first area rotatably connected to the other end of the first link and a second area rotatably connected to the other end of the second link.

The strength assist device may further include a body part in which the multi-link part, the profile controller, and the elastic force providing part are received, and the multi-link part may further include a fourth link having one end fixed to the body part and the other end rotatably connected to the first area of the third link.

The multi-link part may further include a fifth link having one end fixed to the body part and the other end rotatably connected to a third area of the third link.

The strength assist device may further include an end link part having one side rotatably connected to the body part and the other side connected to the elastic force providing part.

The elastic force providing part may include a plurality of springs, one end of each spring may be connected to the other end of the second link, and the other end of the spring may be connected to the other side of the end link part.

The profile controller may include a first gear engaged with the first link and rotating around the central rotational axis.

The profile controller may include a second gear engaged with the first gear.

The profile controller may further include a third gear fixedly connected to the first gear and rotating around the central rotational axis.

A size of the first gear may be greater than a size of the third gear.

The profile controller may further include a stopper interfering with teeth provided on the outer circumference of the third gear to restrict the rotation of the third gear.

A recessed portion may be provided in a portion of the circumference of the third gear in which the first gear and the first link are engaged with each other, and the recessed portion may be recessed toward the central rotational axis.

The profile controller may include: a first pulley connected to the first link and rotating around the central rotational axis; a second pulley spaced apart from the first pulley; and a belt wrapping around the first pulley and the second pulley.

The profile controller may further include a worm gear engaged with the first gear.

According to another aspect of the present disclosure, a strength assist device may include: a multi-link part including one or more links; a profile controller connected to one end portion of the multi-link part, and rotating around a central rotational axis; an elastic force providing part connected to the other end portion of the multi-link part, and providing an elastic force to the multi-link part; and a power source providing power to the profile controller. When the profile controller is rotated by the power source, one end portion of the multi-link part may revolve around the central rotational axis, and the profile controller may selectively allow or restrict the revolution of one end portion of the multi-link part.

The strength assist device may further include: a body part in which the multi-link part, the profile controller, and the elastic force providing part are received; a support part provided on one side of the body part; and a pressure sensor provided on an inner surface of the support part and sensing a pressure.

The strength assist device may further include a controller controlling the power source to drive the profile controller according to the pressure applied to the pressure sensor.

The first link may be bent toward the fourth link.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
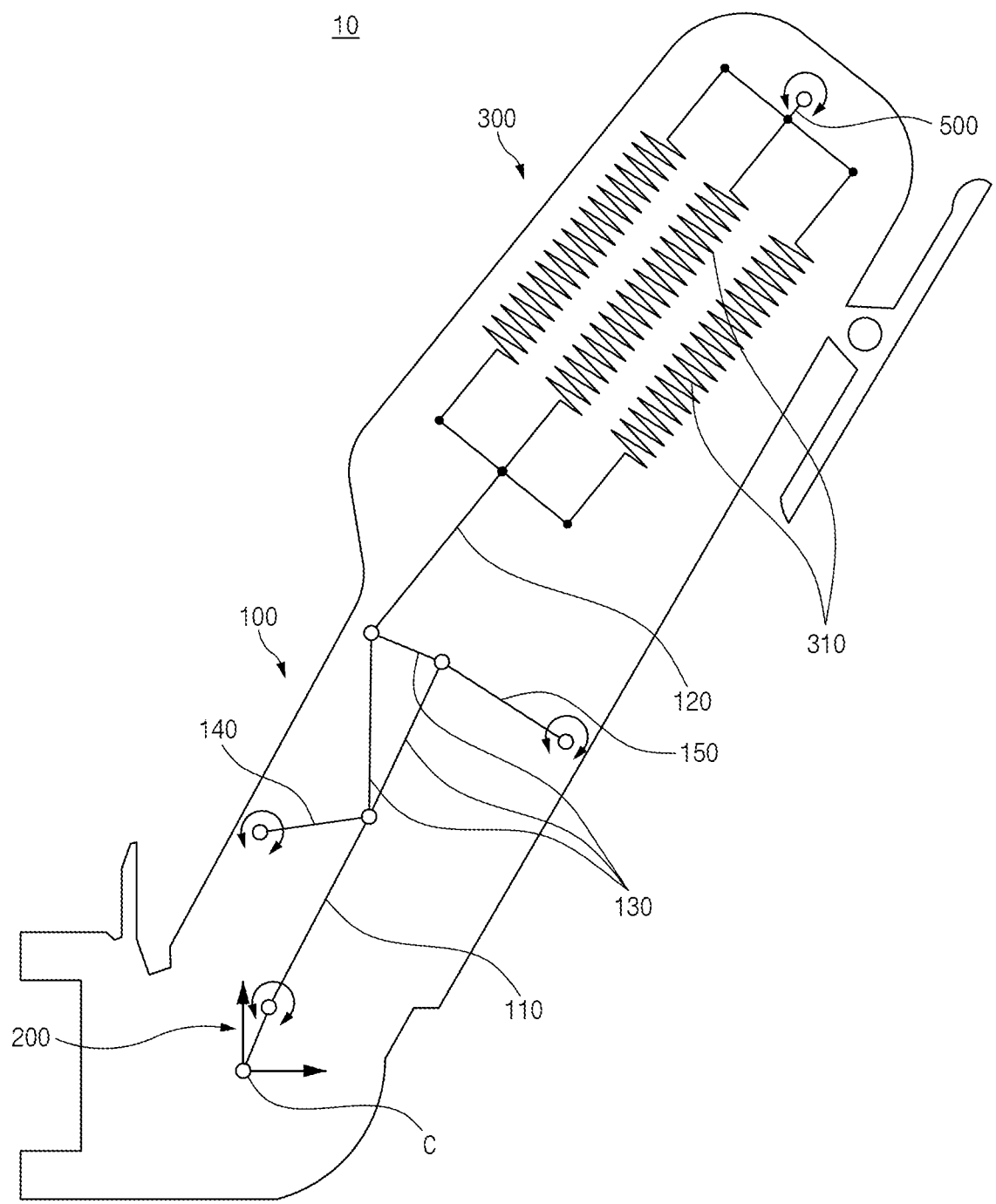
FIG. 1 illustrates a conceptual view of a structure of a strength assist device according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a strength assist device according to exemplary forms of the present disclosure will be described in detail with reference to the accompanying drawings.

Strength Assist Device

Figure 2:
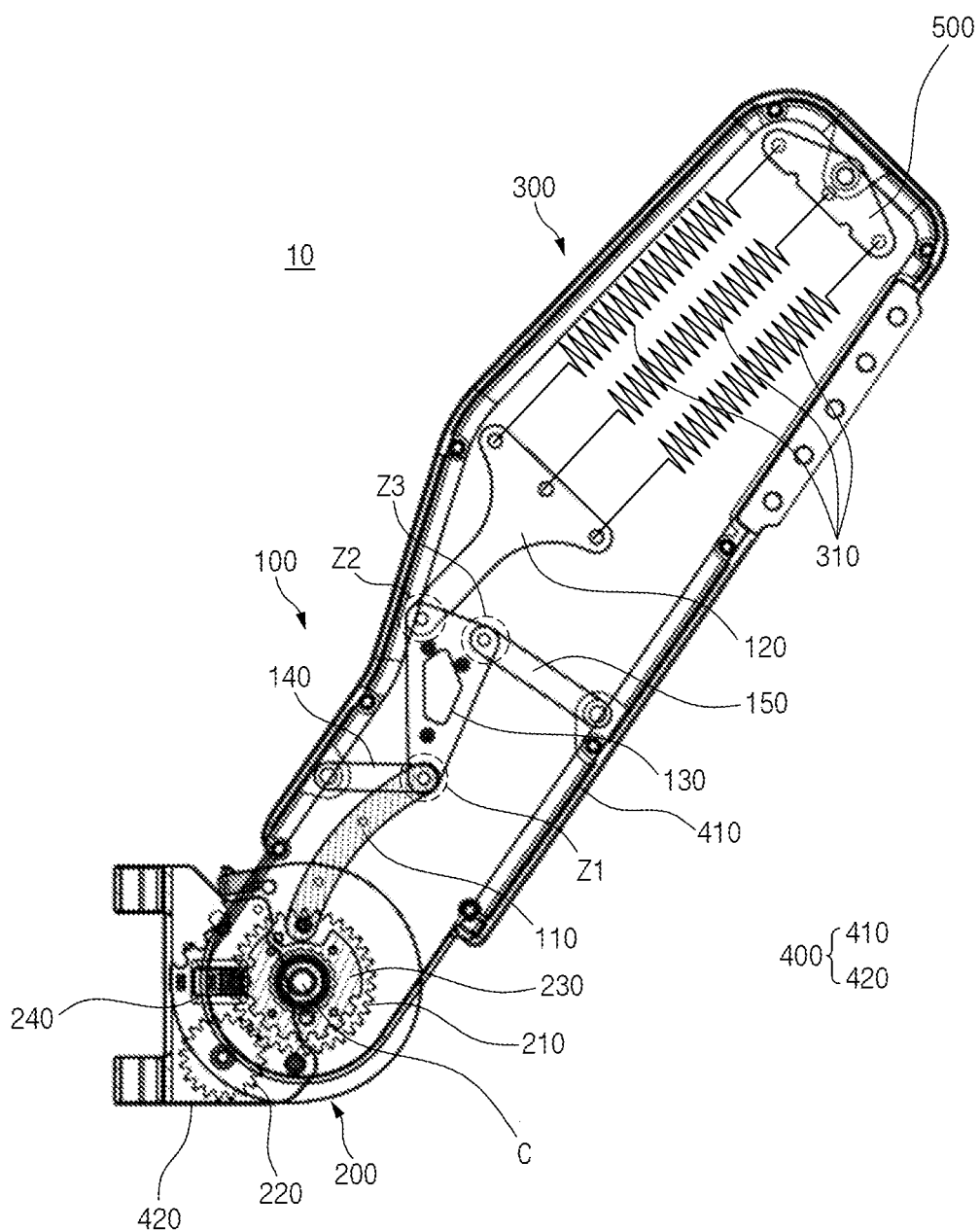
FIG. 2 illustrates an internal structure of a strength assist device according to a first exemplary form of the present disclosure.

FIG. 1 illustrates a conceptual view of a structure of a strength assist device according to an exemplary form of the present disclosure, and FIG. 2 illustrates an internal structure of a strength assist device according to a first exemplary form of the present disclosure.

As illustrated in FIG. 1, a strength assist device 10 may include a multi-link part 100. More specifically, the multi-link part 100 may include a plurality of links. In one form, the multi-link part 100 may have a linkage structure in which the plurality of links are rotatably connected to each other. For example, the plurality of links provided in the multi-link part 100 may be rotatably connected to each other on the same plane.

In addition, the strength assist device 10 may include a profile controller 200 connected to one end portion of the multi-link part 100, and rotating around a central rotational axis C (the center of the profile controller 200). More specifically, when the profile controller 200 rotates around the central rotational axis C, one end portion of the multi-link part 100 may be fixedly connected to the profile controller 200 so that one end portion of the multi-link part 100 may revolve around the central rotational axis C. The function and configuration of the profile controller 200 will be described below.

Meanwhile, the strength assist device 10 may further include an elastic force providing part 300 connected to the other end portion of the multi-link part 100, and providing an elastic force to the multi-link part 100. More specifically, the elastic force providing part 300 may include a spring 310. In another form, the elastic force providing part 300 may include a plurality of springs 310. FIG. 2 illustrates the elastic force providing part 300 including three springs 310.

Referring to FIG. 2, the strength assist device 10 may further include a body part 400 in which the multi-link part 100, the profile controller 200, and the elastic force providing part 300 are received. More specifically, the body part 400 may include a first body 410 in which the multi-link part 100, the profile controller 200, and the elastic force providing part 300 are received, and a second body 420 rotatably connected to the first body 410. For example, the first body 410 and the second body 420 may be pivotally connected to each other so as to be rotatable relative to the central rotational axis C.

For example, the strength assist device 10 according to an exemplary form of the present disclosure may be mounted on the user's arm and shoulder. Here, the strength assist device 10 may be mounted in a manner that allows the center of the profile controller 200 to face a joint area where the user's arm and shoulder meet, and the first body 410 may be mounted on the user's arm, and the second body 420 may be mounted on the user's shoulder.

Thus, the strength assist device 10 according to an exemplary form of the present disclosure may assist in providing the muscle strength required for the user depending on a rotation angle of the arm. That is, when the first body 410 rotates with respect to the second body 420 around the central rotational axis C as the arm rotates, a relative position between the other end portion of the multi-link part 100 and the elastic force providing part 300 may change due to the linkage structure of the multi-link part 100 in which the plurality of links are linked. Since the elastic force which the elastic force providing part 300 connected to the other end portion of the multi-link part 100 provides to the multi-link part 100 also changes, different magnitudes of torque may be provided to the user depending on the rotation angles of the user's arm.

Accordingly, the torque provided to the user in the strength assist device 10 according to an exemplary form of the present disclosure may be understood as a functional relationship with respect to the rotation angle between the first body 410 and the second body 420. Furthermore, the strength assist device according to an exemplary form of the present disclosure may have various types of functional relationships of the torque with respect to the rotation angle between the first body 410 and the second body 420 by a simple operation without the hassle of replacing parts/components. Thus, each user who wants to use the strength assist device may be provided with an optimized torque.

To this end, the profile controller 200 in the strength assist device 10 according to an exemplary form of the present disclosure may selectively allow or restrict the revolution of one end portion of the multi-link part 100. Hereinafter, the configuration of the multi-link part 100 and the profile controller 200 for achieving the aforementioned objective in the strength assist device 10 according to an exemplary form of the present disclosure will be described in detail.

As illustrated in FIGS. 1 and 2, the multi-link part 100 may include a first link 110 having one end connected to the profile controller 200, and a second link 120 having one end connected to the elastic force providing part 300.

Meanwhile, the multi-link part 100 may further include a third link 130 having a first area Z1 rotatably connected to the other end of the first link 110, and a second area Z2 rotatably connected to the other end of the second link 120. That is, the first to third links 110, 120, and 130 may move relative to the body part 400 inside the body part 400.

Referring to FIGS. 1 and 2, the multi-link part 100 may further include a fourth link 140 having one end fixed to the body part 400 and the other end rotatably connected to the first area Z1 of the third link 130. More specifically, one end of the fourth link 140 may be fixedly connected to the inner side of the first body 410. Thus, the first link 110, the third link 130, and the fourth link 140 may be connected together in the first area Z1. Meanwhile, the first link 110 may be bent toward the fourth link 140 as illustrated in FIG. 2, but the shape of the first link 110 is not limited to that illustrated in FIG. 2.

In addition, the multi-link part 100 may further include a fifth link 150 having one end fixed to the body part 400 and the other end rotatably connected to a third area Z3 of the third link 130. More specifically, one end of the fifth link 150 may be fixedly connected to the inner side of the first body 410. Meanwhile, the third link 130 may include the first to third areas Z1, Z2, and Z3 as described above. More specifically, the third link 130 may have the first to third areas Z1, Z2, and Z3 on corner portions thereof, and an empty central area as illustrated in FIG. 2.

Referring to FIG. 2, according to the first exemplary form of the present disclosure, the profile controller 200 may include a first gear 210 engaged with the first link 110 and rotating around the central rotational axis C, and a second gear 220 engaged with the first gear 210. Thus, when the second gear 220 rotates, the first gear 210 engaged with the second gear 220 may rotate around the central rotational axis C.

In addition, the profile controller 200 may further include a third gear 230 fixedly connected to the first gear 210 and rotating around the central rotational axis C. That is, according to the first exemplary form of the present disclosure, since the first gear 210 and the third gear 230 are fixed to each other, they may rotate together around the central rotational axis C. More specifically, an outer diameter of the first gear 210 may be greater than an outer diameter of the third gear 230.

Referring to FIG. 2, the profile controller 200 may further include a stopper 240 interfering with teeth provided on the outer circumference of the third gear 230 to restrict the rotation of the third gear 230.

The operation of the strength assist device 10 according to the first exemplary form of the present disclosure will be detailed based on the above description.

Figure 3A:
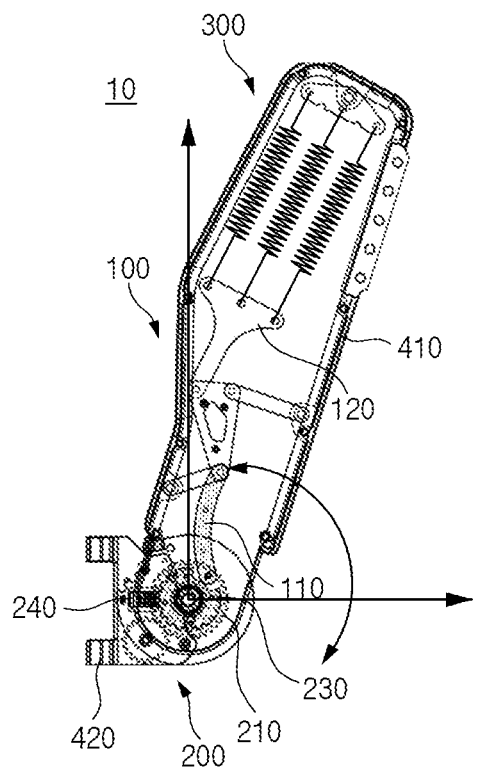
FIGS. 3A, 3B and 3C illustrate various driving examples related to the rotation of a first body and a second body in the strength assist device according to the first exemplary form of the present disclosure.
Figure 3B:
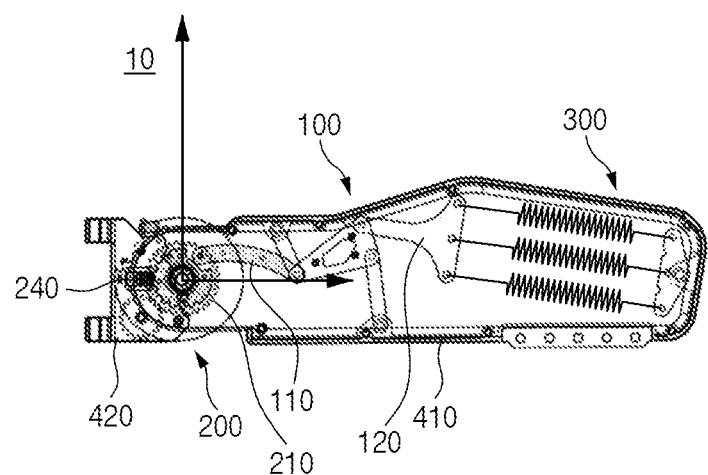
Figure 3C:
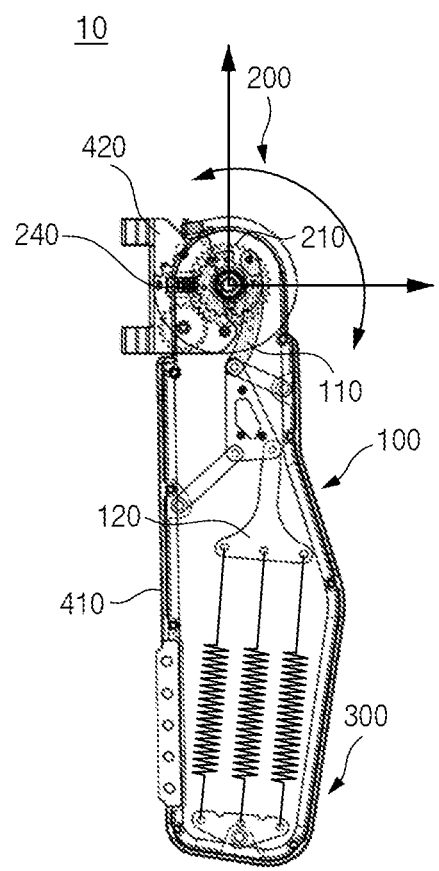
Figure 4:
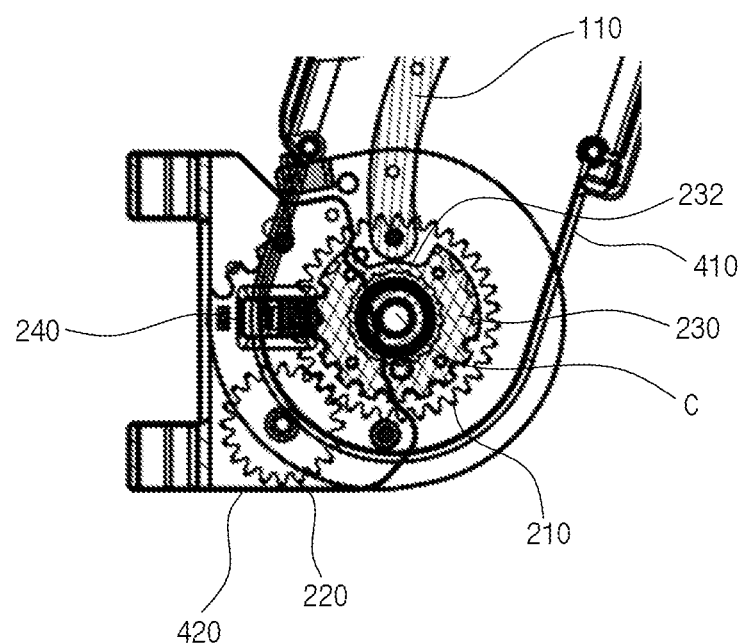
FIGS. 4 to 7 illustrate various driving examples for adjusting a torque profile using a profile controller in the strength assist device according to the first exemplary form of the present disclosure.
Figure 5:
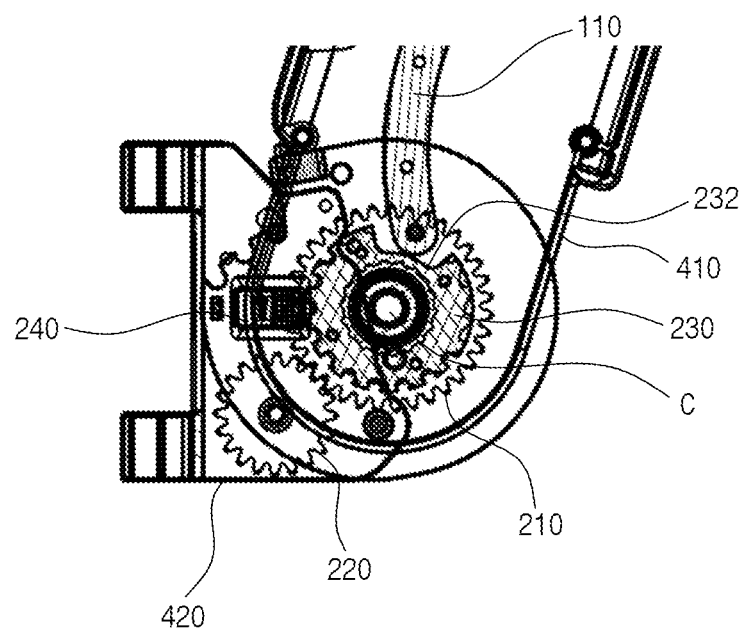
Figure 6:
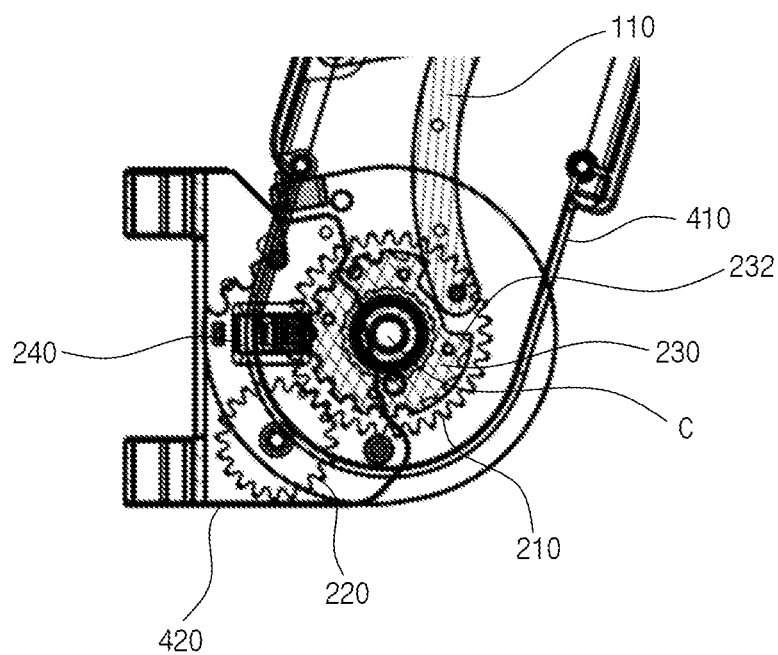
Figure 7:
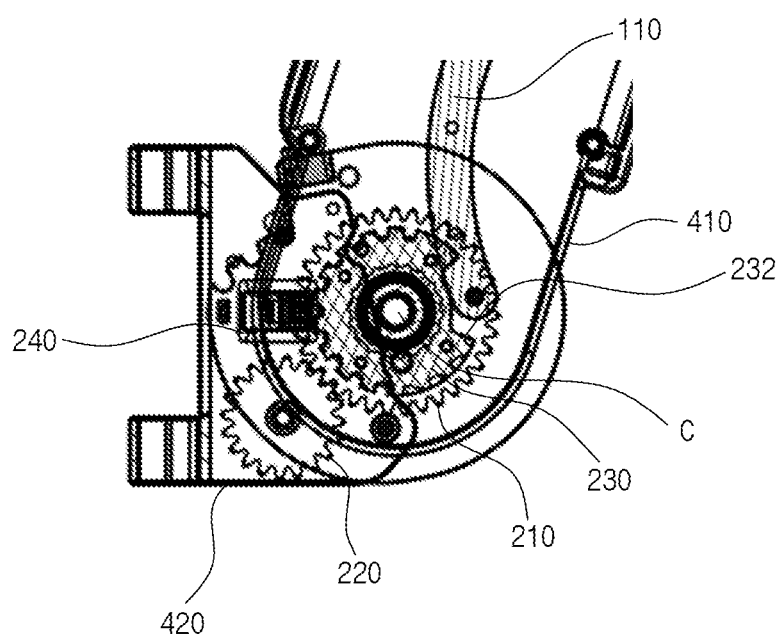

FIG. 3 illustrates various driving examples related to the rotation of a first body and a second body in the strength assist device according to the first exemplary form of the present disclosure.

As illustrated in FIG. 3, even when the first body 410 rotates relative to the second body 420 according to a movement of the user wearing the strength assist device 10, a portion of the first link 110 engaged with the first gear 210 may be fixed to the first body 410. This may be because the stopper 240 of the profile controller interferes with the teeth of the third gear 230 to thereby restrict the rotation of the third gear 230 and the first gear 210 fixedly connected to the third gear 230. Meanwhile, even though one end of the first link 110 is fixed to the first gear 210, the other links in the multi-link part 100 may move relative to the first body 410 as the first body 410 rotates with respect to the second body 420. Accordingly, the elastic force which the elastic force providing part 300 provides to the second link 120 or the multi-link part 100 may also vary, and as a result, the torque which the strength assist device 10 provides to the user may also vary depending on the rotation angle of the first body 410 with respect to the second body 420. For example, FIG. 3 illustrates a state in which the user wearing the strength assist device 10 raises the arm up (see view (a) in FIG. 3), a state in which the user wearing the strength assist device 10 raises the arm horizontally (see view (b) in FIG. 3), and a state in which the user wearing the strength assist device 10 lowers the arm down (see view (c) in FIG. 3). Based on the above description, the strength assist device 10 according to an exemplary form of the present disclosure may form different magnitudes of torque when the user raises the arm up, raises the arm horizontally, and lowers the arm down. In particular, even if an angle at which the user raises the arm is the same, a torque formed by the strength assist device may vary according to the operation of the profile controller to be described below.

FIGS. 4 to 7 illustrate various driving examples for adjusting a torque profile using a profile controller in the strength assist device according to the first exemplary form of the present disclosure.

Referring to FIGS. 4 to 7, when the user operates the stopper 240 to release interference between the stopper 240 and the third gear 230 and then rotates the second gear 220, the first gear 210 fixedly connected to the second gear 220 may rotate around the central rotational axis C. Since the first gear 210 is fixedly connected to one end of the first link 110, one end of the first link 110 may also revolve around the central rotational axis C. As one end of the first link 110 revolves around the central rotational axis C, a relative position between the second link 120 and the elastic force providing part 300 may change due to the linkage structure of the links in the multi-link part 100. As illustrated in FIGS. 4 to 7, even if a rotation angle between the first body 410 and the second body 420 does not change, a torque that the strength assist device applies to the user on the central rotational axis C may vary. Thus, the user who wants to use the strength assist device may be provided with an optimized torque.

Figure 8:
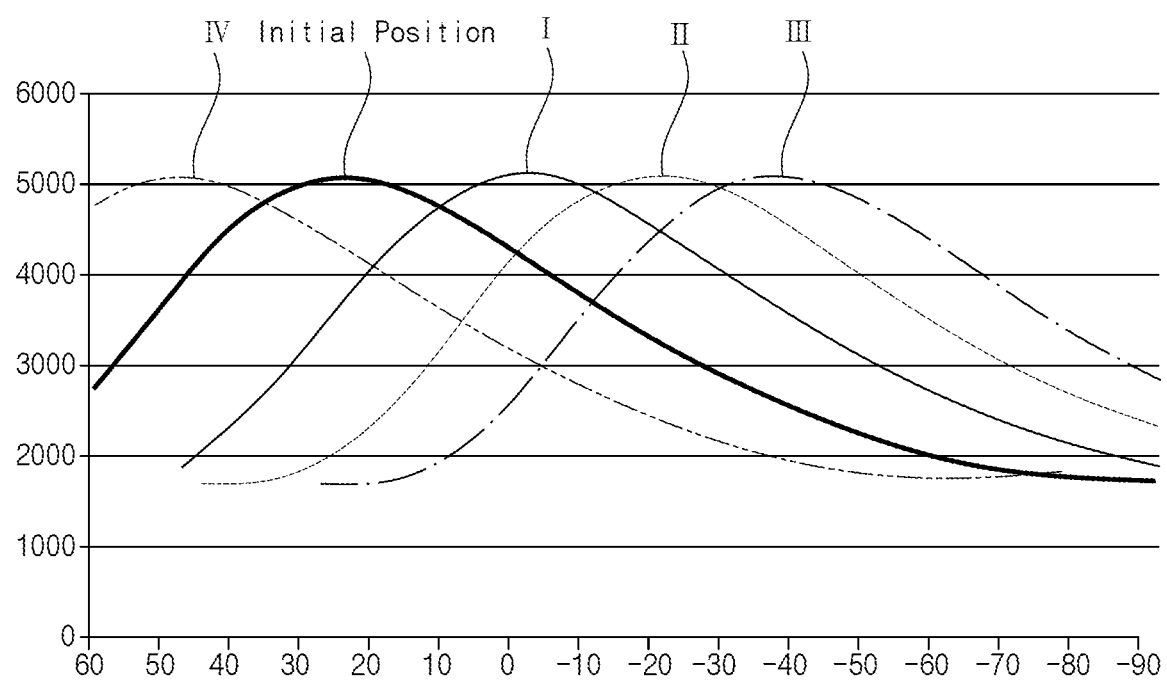
FIG. 8 illustrates a graph of various types of functional relationships of rotation angle-torque formed by a strength assist device according to an exemplary form of the present disclosure.

FIG. 8 illustrates a graph of various types of functional relationships of rotation angle-torque formed by a strength assist device according to an exemplary form of the present disclosure.

In FIG. 8, an x-axis is a rotation angle between the first body 410 and the second body 420, and a y-axis is the magnitude of a torque which the strength assist device provides to the user. As illustrated in FIG. 8, when a relationship between a rotation angle and a torque set in an initial position does not meet the requirement of the user, a graph of FIG. 8 representing the above relationship may be moved in a horizontal direction on the x-axis (parallel transference) by allowing the second gear 220 to rotate the first gear 210.

For example, by rotating the first gear 210 in a state in which a peak torque has been provided to the user in a rotation angle range of 20° to 30° (see the graph indicated by "initial position" in FIG. 8), the user may adjust the peak torque of the strength assist device to be provided in a rotation angle range of −10° to 0° (see the graph indicated by "I" in FIG. 8).

Based on the above description, as the first gear 210 of the profile controller 200 rotates, one end of the first link 110 may revolve around the central rotational axis C, and accordingly, one end of the second link 120 may also move. Accordingly, a force which the elastic force providing part 300 applies to the multi-link part 100 may vary. In particular, one end of the first link 110 may revolve around the central rotational axis C even when the rotation angle between the first body 410 and the second body 420 is maintained, and thus the relationship between the rotation angle and the torque may be adjusted so that the torque which the strength assist device provides to the user may vary even if the rotation angle of the user's arm is the same.

Referring to FIG. 2, the strength assist device 10 according to an exemplary form of the present disclosure may further include an end link part 500 having one side rotatably connected to the body part 400 and the other side connected to the elastic force providing part 300, that is, the springs 310. Here, one end of each spring 310 provided in the elastic force providing part 300 may be connected to the other end of the second link 120, and the other end of the spring 310 may be connected to the other side of the end link part 500.

In addition, as illustrated in FIG. 2, according to an exemplary form of the present disclosure, a recessed portion 232 may be provided in a portion of the circumference of the third gear 230 in which the first gear 210 and the first link 110 are engaged with each other, and the recessed portion 232 may be recessed toward the central rotational axis C. The recessed portion 232 may prevent the third gear 230 from interfering in the engagement area between the first gear 210 and the first link 110.

Meanwhile, the stopper 240 may move forward or backward to the third gear 230 to interfere with or be disengaged from the teeth provided on the circumference of the third gear 230, thereby determining whether or not to interfere with the third gear 230.

Figure 9:
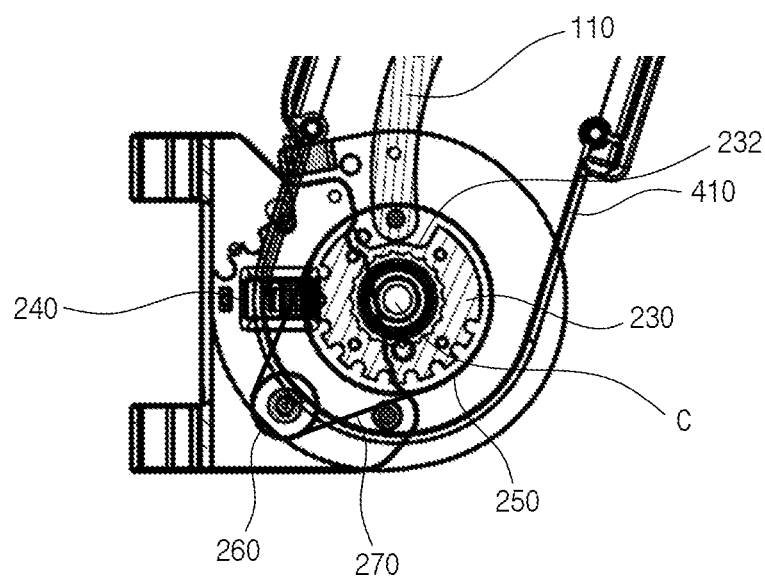
FIG. 9 illustrates an enlarged view of a profile controller in a strength assist device according to a second exemplary form of the present disclosure.

FIG. 9 illustrates an enlarged view of a profile controller in a strength assist device according to a second exemplary form of the present disclosure. Hereinafter, the strength assist device according to the second exemplary form of the present disclosure will be described by focusing on differences from the strength assist device according to the first exemplary form of the present disclosure.

As illustrated in FIG. 9, according to the second exemplary form of the present disclosure, the profile controller 200 may include a first pulley 250 connected to the first link 110 and rotating around the central rotational axis C, a second pulley 260 spaced apart from the first pulley 250, and a belt 270 wrapping around the first pulley 250 and the second pulley 260.

According to the second exemplary form of the present disclosure, the user may rotate the second pulley 260 to move the belt 270 and thereby rotate the first pulley 250, and accordingly, the above-described relationship between the rotation angle and the torque may be adjusted. The other elements including the recessed portion 232 and operation principle of the strength assist device according to the second exemplary form of the present disclosure will be understood based on the above description in the first exemplary form of the present disclosure.

Figure 10:
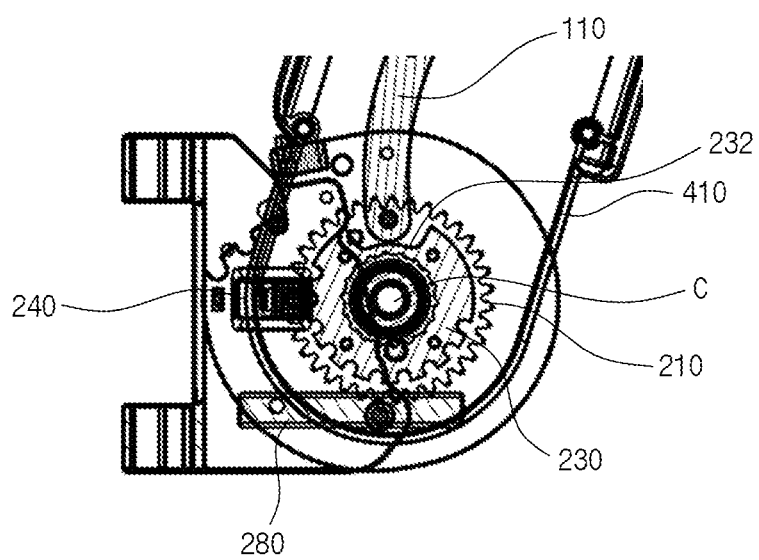
FIG. 10 illustrates an enlarged view of a profile controller in a strength assist device according to a third exemplary form of the present disclosure.

FIG. 10 illustrates an enlarged view of a profile controller in a strength assist device according to a third exemplary form of the present disclosure.

As illustrated in FIG. 10, according to the third exemplary form of the present disclosure, the profile controller 200 may include the first gear 210 and a worm gear 280 engaged with the first gear 210.

According to the third exemplary form of the present disclosure, the user may rotate the worm gear 280 to thereby rotate the first gear 210, and accordingly, the above-described relationship between the rotation angle and the torque may be adjusted. The other elements including the recessed portion 232 and operation principle of the strength assist device according to the third exemplary form of the present disclosure will be understood based on the above description in the first exemplary form of the present disclosure.

Figure 11:
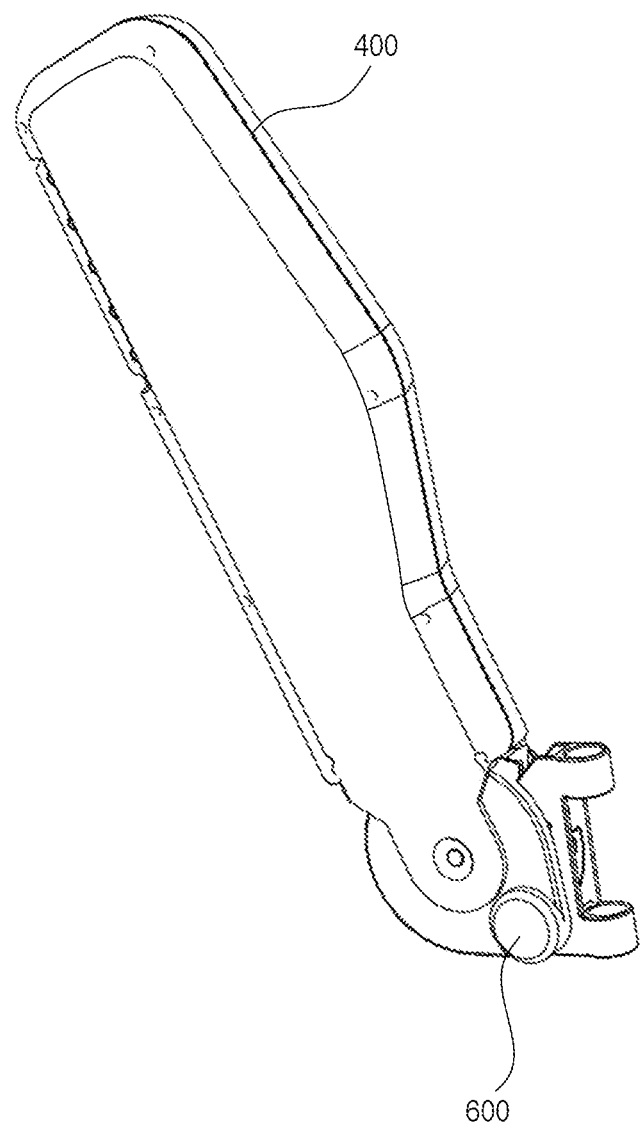
FIG. 11 illustrates a strength assist device according to another exemplary form of the present disclosure.

FIG. 11 illustrates a strength assist device according to another exemplary form of the present disclosure.

The torque of the strength assist device according to another exemplary form of the present disclosure may be adjusted manually, but may also be adjusted automatically using a separate power source. For example, the second gear 220 (see FIG. 2) in the first exemplary form of the present disclosure, the second pulley 260 (see FIG. 9) in the second exemplary form of the present disclosure, and the worm gear 280 (see FIG. 10) in the third exemplary form of the present disclosure may be driven by the user manually, but may also be driven by the power source automatically.

More specifically, referring to FIG. 11, the strength assist device 10 according to another exemplary form of the present disclosure may further include a power source 600 providing power to the profile controller 200 (see FIG. 1, etc.). More specifically, the power source 600 may provide a torque to the second gear 220 (see FIG. 2), the second pulley 260 (see FIG. 9), or the worm gear 280 (see FIG. 10) of the profile controller. The power source 600 may be, for example, an electric motor, but various types of power sources may be applied. According to another exemplary form of the present disclosure, when the profile controller 200 (see FIG. 1, etc.) is rotated by the power source 600, one end portion of the multi-link part 100 (see FIG. 1, etc.) may revolve around the central rotational axis C.

Figure 12:
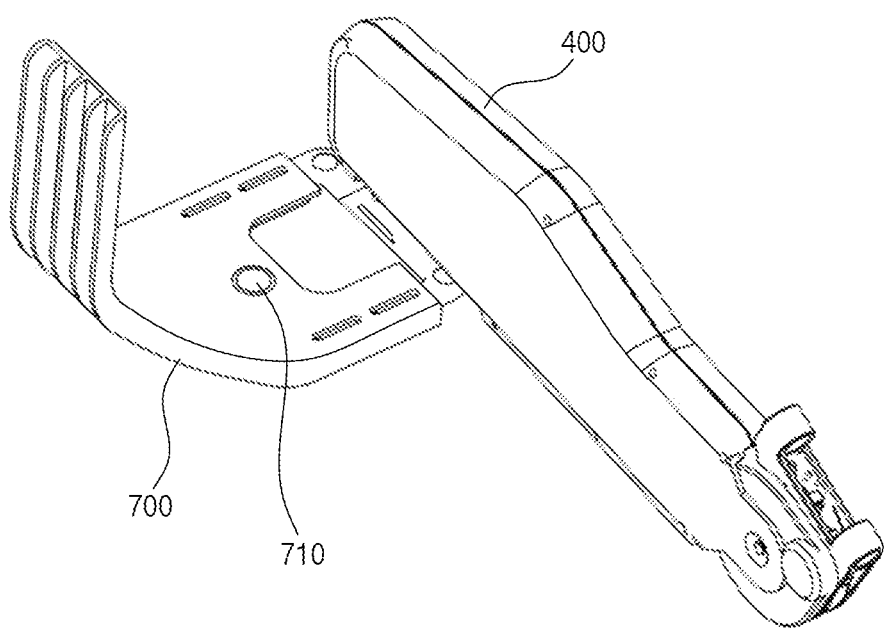
FIG. 12 illustrates a strength assist device according to another exemplary form of the present disclosure.

FIG. 12 illustrates a strength assist device according to another exemplary form of the present disclosure.

As illustrated in FIG. 12, the strength assist device 10 according to another exemplary form of the present disclosure may further include a support part 700 provided on one side of the body part 400. The support part 700 may support the user's arm.

In addition, the strength assist device 10 may further include a pressure sensor 710 provided on an inner surface of the support part 700 and sensing a pressure. Since the support part 700 supports the user's arm as described above, the pressure sensor 710 may measure a pressure applied by the user's arm. Thus, the pressure sensor 710 may measure a load applied to the user's arm in real time during the user's activities or tasks.

Meanwhile, the strength assist device 10 may further include a controller (not shown) controlling the driving of the power source according to the pressure (the amount of force) applied to the pressure sensor 710. Thus, the pressure sensor 710 may measure the load applied to the user's arm in real time and transmit information about the measured result to the controller, and the controller may control the driving of the power source 600 depending on the information and adjust a torque required by the user in real time.

As set forth above, the strength assist device according to exemplary forms of the present disclosure may easily change a torque profile.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A strength assist device, comprising:
    a multi-link part including a plurality of links;
    a profile controller connected to a first end portion of the multi-link part and configured to rotate around a central rotational axis; and
    an elastic force providing part connected to a second end portion of the multi-link part and configured to provide an elastic force to the multi-link part,
    wherein when the profile controller rotates, the first end portion of the multi-link part is configured to revolve around the central rotational axis, and
    the profile controller is configured to selectively restrict a revolution of the first end portion of the multi-link part,
    wherein:
        among links of the plurality of links, a first link has a first end connected to the profile controller, and when the profile controller rotates, the first end of the first link is configured to revolve around the central rotational axis, and the elastic force applied to the multi-link part varies,
        the profile controller includes a first gear engaged with the first link and configured to rotate around the central rotational axis,
        the profile controller includes a second gear engaged with the first gear,
        the profile controller further includes a third gear fixedly connected to the first gear and configured to rotate around the central rotational axis, and
        the profile controller further includes a stopper configured to interfere with teeth provided on an outer circumference of the third gear to restrict a rotation of the third gear.

2. The strength assist device according to claim 1, wherein, among the links of the plurality of links, a second link has a first end connected to the elastic force providing part, and
    when the profile controller rotates, the first end of the second link is configured to move, and the elastic force applied to the multi-link part varies.

3. The strength assist device according to claim 2, wherein, among the links of the plurality of links, a third link has a first area rotatably connected to a second end of the first link and a second area rotatably connected to a second end of the second link.

4. The strength assist device according to claim 3, further comprising a body part configured to accommodate the multi-link part, the profile controller, and the elastic force providing part,
    wherein, among the links of the plurality of links, a fourth link has a first end fixed to the body part and a second end rotatably connected to the first area of the third link.

5. The strength assist device according to claim 4, wherein the first link is bent toward the fourth link.

6. The strength assist device according to claim 4, wherein, among the links of the plurality of links, a fifth link has a first end fixed to the body part and a second end rotatably connected to a third area of the third link.

7. The strength assist device according to claim 6, further comprising an end link part having a first side rotatably connected to the body part and a second side connected to the elastic force providing part.

8. The strength assist device according to claim 7, wherein the elastic force providing part includes a plurality of springs,
    a first end of each spring of the plurality of springs is connected to the second end of the second link, and
    a second end of each spring of the plurality of springs is connected to the second side of the end link part.

9. The strength assist device according to claim 1, wherein a size of the first gear is greater than a size of the third gear.

10. The strength assist device according to claim 1, wherein the profile controller includes:
    a first pulley connected to the first link and configured to rotate around the central rotational axis;
    a second pulley spaced apart from the first pulley; and
    a belt configured to wrap around the first pulley and the second pulley.

11. The strength assist device according to claim 1, wherein the profile controller further includes a worm gear engaged with the first gear.

12. A strength assist device, comprising:
    a multi-link part including a plurality of links;
    a profile controller connected to a first end portion of the multi-link part and configured to rotate around a central rotational axis;
    an elastic force providing part connected to a second end portion of the multi-link part and configured to provide an elastic force to the multi-link part; and
    a power source configured to supply power to the profile controller,
    wherein when the profile controller is rotated by the power source, one end portion of the multi-link part is configured to revolve around the central rotational axis, and
    the profile controller is configured to selectively allow a revolution of the first end portion of the multi-link part,
    wherein among links of the plurality of links, a first link has a first end connected to the profile controller, and when the profile controller rotates, the first end of the first link is configured to revolve around the central rotational axis, and the elastic force applied to the multi-link part varies,
    wherein the profile controller includes a first gear engaged with the first link and configured to rotate around the central rotational axis,
    wherein the profile controller includes a second gear engaged with the first gear,
    wherein the profile controller further includes a third gear fixedly connected to the first gear and configured to rotate around the central rotational axis, and wherein a recessed portion is provided in a portion of a circumference of the third gear in which the first gear and the first link are engaged with each other, and the recessed portion is recessed toward the central rotational axis.

13. The strength assist device according to claim 12, further comprising:

a body part configured to accommodate the multi-link part, the profile controller, and the elastic force providing part;

a support part provided on a first side of the body part; and a pressure sensor provided on an inner surface of the support part and configured to sense a pressure.

14. The strength assist device according to claim 13, further comprising a controller configured to control the power source to drive the profile controller based on the sensed pressure by the pressure sensor.

* * * * *